(12) United States Patent
Okamoto

(10) Patent No.: US 9,644,563 B2
(45) Date of Patent: May 9, 2017

(54) ENERGY MANAGEMENT SYSTEM

(71) Applicant: DENSO CORPORATION, Kariya, Aichi-pref. (JP)

(72) Inventor: Kazuya Okamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 649 days.

(21) Appl. No.: 13/772,995

(22) Filed: Feb. 21, 2013

(65) Prior Publication Data

US 2013/0238222 A1 Sep. 12, 2013

(30) Foreign Application Priority Data

Mar. 6, 2012 (JP) .................................. 2012-49574

(51) Int. Cl.
*F02D 41/30* (2006.01)
*B60W 10/06* (2006.01)
(Continued)

(52) U.S. Cl.
CPC ............. *F02D 41/30* (2013.01); *B60W 10/06* (2013.01); *B60W 10/30* (2013.01);
(Continued)

(58) Field of Classification Search
CPC .. F02D 41/30; F02D 41/2425; F02D 41/2487; F02D 2200/0625;
(Continued)

(56) References Cited

U.S. PATENT DOCUMENTS 5,558,064 A * 9/1996 Buslepp ........................ 123/480
7,565,942 B2 * 7/2009 Shibata et al. ................ 180/243
(Continued)

FOREIGN PATENT DOCUMENTS

JP 05-126920 5/1993
JP 2003-039975 2/2003
(Continued)

OTHER PUBLICATIONS

Office Action (2 pages) dated Mar. 18, 2014, issued in corresponding Japanese Application No. 2012-049574 and English translation (2 pages).

*Primary Examiner* — Joseph Dallo
(74) *Attorney, Agent, or Firm* — Nixon & Vanderhye P.C.

(57) ABSTRACT

An engine control unit of a power system is provided with a memory module which stores a fuel consumption data. An electric power ECU of a power supply system controls an operation mode of a generator based on a fuel consumption associated data transmitted from an engine control unit. An air-condition ECU of a heat system controls an operation mode of a compressor based on the fuel consumption associated data transmitted from the engine control unit. By updating the fuel consumption data stored in the engine control unit, control characteristics of the power supply system and the heat system can be varied. The fuel consumption associated data is transmitted to the ECU in preference to the other data. Moreover, the fuel consumption associated data is transmitted in a period which the electric power ECU and the air-condition ECU require.

7 Claims, 13 Drawing Sheets

(51) Int. Cl.
  *B60W 10/30*    (2006.01)
  *F02D 41/24*    (2006.01)
  *B60W 30/188*   (2012.01)
  *B60W 50/00*    (2006.01)

(52) U.S. Cl.
  CPC ..... *B60W 30/1882* (2013.01); *F02D 41/2425* (2013.01); *F02D 41/2487* (2013.01); *B60L 2200/26* (2013.01); *B60W 2050/0089* (2013.01); *F02D 2200/0625* (2013.01)

(58) Field of Classification Search
  CPC .. B60W 30/1882; B60W 10/06; B60W 10/30; B60W 2050/0089; B60L 2200/26
  USPC ............. 123/478–494; 701/102–105, 22, 54; 180/65.265, 65.28, 65.285, 65.22, 65.29, 180/65.27; 903/930; 477/3, 174
  See application file for complete search history.

(56) References Cited

U.S. PATENT DOCUMENTS

| | | | | |
|---|---|---|---|---|
| 8,078,324 | B2* | 12/2011 | Oakes | 700/276 |
| 2002/0016656 | A1* | 2/2002 | Chung et al. | 701/36 |
| 2005/0086953 | A1* | 4/2005 | Sugesawa et al. | 62/133 |
| 2005/0251299 | A1* | 11/2005 | Donnelly et al. | 701/19 |
| 2006/0030990 | A1* | 2/2006 | Anderson et al. | 701/50 |
| 2006/0273591 | A1* | 12/2006 | Yamashita et al. | 290/40 C |
| 2006/0276937 | A1* | 12/2006 | Yamashita | 700/291 |
| 2007/0021267 | A1* | 1/2007 | Obayashi et al. | 477/107 |
| 2007/0205030 | A1* | 9/2007 | Shibata et al. | 180/65.2 |
| 2008/0246338 | A1* | 10/2008 | Donnelly et al. | 307/54 |
| 2008/0284384 | A1* | 11/2008 | Kato et al. | 322/17 |
| 2008/0319605 | A1* | 12/2008 | Davis | 701/35 |
| 2009/0071736 | A1* | 3/2009 | Mori et al. | 180/65.285 |
| 2009/0133859 | A1* | 5/2009 | Suzuki et al. | 165/121 |
| 2010/0038158 | A1* | 2/2010 | Whitney et al. | 180/65.265 |
| 2010/0039054 | A1* | 2/2010 | Young et al. | 318/376 |
| 2010/0100292 | A1* | 4/2010 | Lv | 701/60 |
| 2010/0114457 | A1* | 5/2010 | Yamada et al. | 701/103 |
| 2010/0241308 | A1* | 9/2010 | Kikuchi et al. | 701/36 |
| 2010/0305799 | A1* | 12/2010 | Yamada et al. | 701/22 |
| 2010/0305827 | A1 | 12/2010 | Fournel et al. | |
| 2011/0004392 | A1* | 1/2011 | Senda et al. | 701/102 |
| 2011/0010063 | A1* | 1/2011 | Ota et al. | 701/58 |
| 2011/0017534 | A1* | 1/2011 | Kaltenbach et al. | 180/65.25 |
| 2011/0060504 | A1* | 3/2011 | Filla et al. | 701/41 |
| 2011/0098873 | A1* | 4/2011 | Koga et al. | 701/22 |
| 2011/0104962 | A1* | 5/2011 | Krause et al. | 440/2 |
| 2011/0109157 | A1* | 5/2011 | Tani | 307/9.1 |
| 2011/0246004 | A1* | 10/2011 | Mineta | 701/22 |
| 2011/0246013 | A1* | 10/2011 | Yee et al. | 701/22 |
| 2011/0246047 | A1* | 10/2011 | Smith et al. | 701/103 |
| 2011/0312468 | A1* | 12/2011 | Ito et al. | 477/15 |
| 2012/0004824 | A1* | 1/2012 | Milton et al. | 701/103 |
| 2012/0022775 | A1* | 1/2012 | Yamada et al. | 701/123 |
| 2012/0173075 | A1* | 7/2012 | Mays | 701/34.2 |

FOREIGN PATENT DOCUMENTS

| | | |
|---|---|---|
| JP | 2005-212564 | 8/2005 |
| JP | 2006-339165 | 12/2006 |
| JP | 2012-41830 | 3/2012 |

\* cited by examiner

ENERGY MANAGEMENT SYSTEM

CROSS-REFERENCE TO RELATED APPLICATION

This application is based on Japanese Patent Application No. 2012-49574 filed on Mar. 6, 2012, the disclosure of which is incorporated herein by reference.

TECHNICAL FIELD

The present disclosure relates to an energy management system which totally controls a plurality of apparatuses driven by a power source.

BACKGROUND

JP-2005-212564A discloses a system in which multiple apparatuses, such as an alternator and an air-conditioner, are driven by an output of an internal combustion engine. Furthermore, the system includes a controller which performs a cooperative control of an alternator and the air-conditioner.

JP-2006-339165A discloses a controller which controls an alternator according to a fuel quantity consumed for generating electricity. The alternator is driven by an internal combustion engine.

In a system where multiple apparatuses are driven by an internal combustion engine, these apparatuses are required to be controlled in such a manner as to restrict a fuel quantity consumed by the internal combustion engine. For example, in a controller for an alternator, it is necessary to store a fuel consumption data about the fuel consumption of the internal combustion engine. Also, in a controller for an air-conditioner, it is necessary to store the fuel consumption data about the fuel consumption of the engine. Furthermore, in a controller for the internal combustion engine, it is necessary to store the fuel consumption data about the fuel consumption of the engine.

The fuel consumption data depend on multiple factors. For example, the fuel consumption data varies depending on a model of the internal combustion engine. Moreover, the fuel consumption data varies depending on a vehicle on which the internal combustion engine is mounted. Thus, multiple fuel consumption data are prepared for multiple factors.

However, in the conventional system, since the multiple controllers mounted on the vehicle store the fuel consumption data, it is necessary to alter the fuel consumption date stored in each of the controllers. As a result, it is necessary to design and manufacture the controllers which correspond to the number of fuel consumption data.

Moreover, when upgrading the fuel consumption data, it is necessary to rewrite the fuel consumption data stored in the controllers for not only the engine but also the multiple apparatuses.

SUMMARY

It is an object of the present disclosure to provide an energy management system which easily handles an alteration of data regarding a fuel consumption.

It is another object of the present disclosure to provide an energy management system which totally controls the data regarding a fuel consumption.

Further, it is another object of the present disclosure to provide an energy management system which is capable of restricting a deterioration in controlling performance while totally controlling the data regarding a fuel consumption.

According to the present disclosure, an energy management system includes a power system having a power source which supplies a power by consuming a fuel and, an energy consumption system having a device driven by the power supplied from the power source.

Further, the energy management system includes: an engine control unit for controlling the power source in such a manner as to restrict a fuel consumption; and a plurality of control units including a device control unit which controls the device in such a manner as to restrict the fuel consumption.

One of the engine control unit and the device control unit is provided with a memory module in which a fuel consumption associated data about the fuel consumption is stored. The other control unit executes a control processing based on the fuel consumption associated data transmitted from said control unit.

According to the above configuration, the original fuel consumption associated data is stored in one of the control units. The other control unit executes a control processing based on the fuel consumption associated data transmitted from said control unit. Thus, by updating the original fuel consumption data stored in one control unit, the fuel consumption data stored in the other control unit can be updated. The energy management system can easily respond to the change of the fuel consumption associated data. The fuel consumption associated data can be intensively managed.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
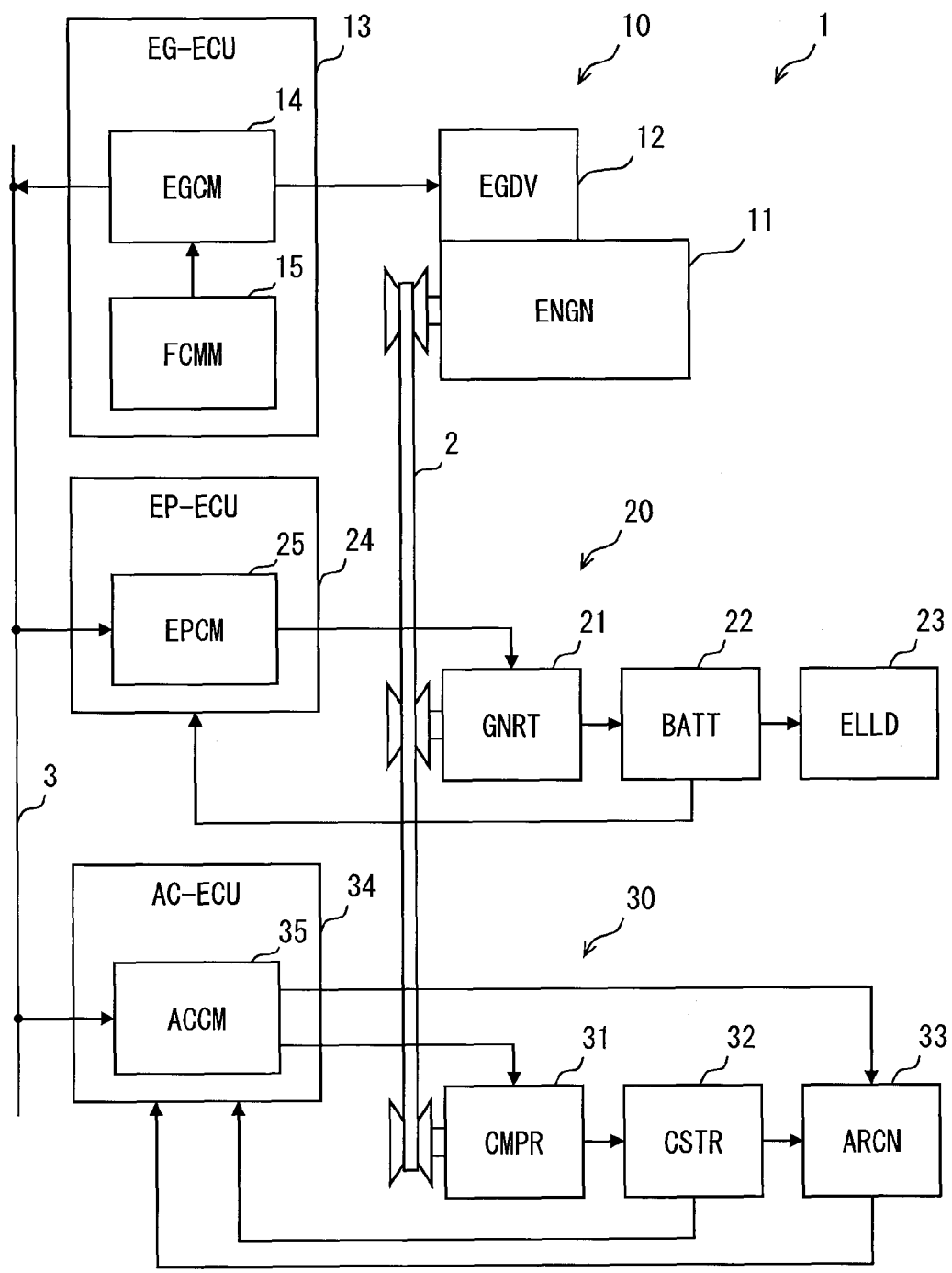
FIG. 1 is a block diagram showing an energy management system according to a first embodiment.

Referring to drawings, embodiments of the present disclosure will be described hereinafter. In these embodiments, the same parts and components as those in each embodiment are indicated with the same reference numerals and the same descriptions will not be reiterated.

[First Embodiment]

FIG. 1 shows an energy management system 1 which totally controls multiple control systems 10, 20, 30 mounted to a vehicle, so that an energy consumption of the vehicle is reduced. The vehicle is equipped with a power system 10 and multiple energy consumption systems 20 and 30. The power system 10 includes a power source which generates power by combusting fuel. The energy consumption systems 20, 30 include apparatuses 21, 31 driven by the power source. The energy consumption systems 20, 30 utilize energy which is mutually different. The energy consumption systems 20, 30 convert the power supplied from the power system 10 into the energy which can be accumulated. The energy consumption systems 20, 30 include a power supply system 20 and a heat system 30.

The power system 10 includes an internal combustion engine (ENGN) 11 as the power source. Furthermore, the power system 10 is provided with an engine device (EGDV) 12 for operating the engine 11, and an engine control unit (EG-ECU) 13 for the engine 11. The engine 11 is the power source which supplies the motive power to a vehicle. Furthermore, the engine 11 is also the power source which supplies the energy to the multiple devices mounted to the vehicle.

The output of the engine 11 is transmitted to the power supply system 20 and the heat system 30 through a power transmission device 2. The power transmission device 2 is comprised of a belt transfer mechanism having a pulley and a belt, or a gear drive mechanism having multiple gears.

The engine device 12 includes control devices which control a driving condition of the engine 11. Also, the engine device 12 can include a starter motor which starts the engine 11. Further, the engine device 12 can includes a device for adjusting the output of the engine 11, for example, a throttle unit adjusting the intake air flow rate, a fuel feed system adjusting a fuel quantity supplied to the engine 11, and an ignition device adjusting an ignition timing of the engine 11.

The engine control unit 13 controls the driving condition of the engine 11 by controlling the engine device 12 according to the driving condition of the engine 11 detected by multiple sensors. The engine control unit 13 controls the engine 11 based on the fuel consumption data in order to restrict the fuel consumption. The engine control unit 13 is provided with an engine control module (EGCM) 14 which performs various controls relevant to the engine 11, and a fuel consumption data memory module (FCMM) 15 which memorizes the data relevant to the fuel consumption.

The fuel consumption data shows a relationship between the engine driving condition and a fuel consumption rate. The fuel consumption data memory module (FCMM) 15 stores the fuel consumption data of the engine 11. The fuel consumption data is one of fuel consumption associated data.

The power supply system 20 generates electric power by using of the power supplied from the power system 10. The power supply system 20 accumulates the generated electric power. The power supply system 20 supplies electric power to electric loads mounted to the vehicle.

The power supply system 20 includes a generator (GNRT) 21, a battery (BATT) 22, an electric load (ELLD) 23 and an electric power ECU (EP-ECU) 24. The generator 21 is driven by the engine 11. The generator 21 is an alternator in the present embodiment. The battery 22 is a secondary battery. The battery 22 accumulates the electric power generated by the generator 21. The electric load 23 is mounted to the vehicle. The electric load 23 can include the engine device 12 and an air-conditioner 33. The generator 21 and the battery 22 supply the electric power to the electric load 23.

The electric power ECU 24 controls the generator 21 by controlling the generator 21 according to a condition of the power supply system 20 detected by multiple sensors. The electric power ECU 24 is provided with an electric power control module (EPCM) 25 which performs controls relevant to the generator 21. For example, the electric power ECU 24 detects a charging rate of the battery 22. The electric power ECU 24 controls the generator 21 so that the charging rate of the battery 22 approaches a predetermined target charge amount.

Furthermore, the electric power ECU 24 controls the generator 21 to restrict the fuel quantity consumed due to a generation of electric energy. The electric power ECU 24 controls the generator 21 based on the fuel consumption associated data in order to restrict the fuel consumption. The electric power ECU 24 executes control processings based on the fuel consumption associated data transmitted from the engine control unit 13. The electric power ECU 24 uses the fuel consumption for generating the electric energy as an index for restricting the fuel consumption due to the generation of electrical energy. The fuel consumption for generating the electric energy is referred to as an electricity-generation fuel consumption. The electricity-generation fuel consumption represents a fuel quantity which is consumed for generating a unit electric energy. For example, when a unit of the electric energy is "kilowatt-hour (kWh)" and a unit of the fuel consumption is "gram (g)", the electricity-generation fuel consumption EC can be expressed as follows:

$$EC = g/kWh.$$

In the following description, the electricity-generation fuel consumption is referred to as an electricity-consumption EC.

The heat system 30 is a system which utilizes thermal energy in a vehicle. For example, the heat system 30 is an air conditioning system for a vehicle. The heat system 30 includes a device temperature regulation system in order to adjust the temperature of in-vehicle parts, for example, a battery and an inverter circuit. Also, the heat system 30 includes a heating system for heating in-vehicle parts. In the following description, an air conditioning system is employed as the heat system 30.

The heat system 30 generates the thermal energy by using of the power supplied from the power system 10. The heat system 30 accumulates the generated thermal energy. The heat system 30 supplies the thermal energy to in-vehicle devices.

The heat system 30 is provided with a compressor (CMPR) 31, a cool storage (CSTR) 32, an air-conditioner (ARCN) 33, and an air-condition ECU (AC-ECU) 34. The compressor 31 is a component part of a refrigerating cycle. The refrigerating cycle generates thermal energy by using of refrigerant which is compressed by the compressor 31 and circulates in the cycle. The compressor 31 can vary its discharge.

The cool storage 32 accumulates the thermal energy generated by the refrigerating cycle. In the present embodiment, the cool storage 32 accumulates the cold energy obtained by an evaporator of the refrigerating cycle. The cool storage 32 supplies the accumulated cold energy to the air-conditioner 33. The air-conditioner 33 adjusts temperature in a compartment of a vehicle. The air-conditioner 33 is one of the thermal loads in the heat system 30.

Even while the engine 11 is OFF, the cool storage 32 can supply the cold energy to the air-conditioner 33. For example, when the vehicle is under an idle reduction control, the air-conditioner 33 can adjusts the compartment temperature by using of the cold energy accumulated in the cool storage 32.

The air-condition ECU 34 controls the discharge of the compressor 31 by controlling the compressor 31 according to a condition of the heat system 30 detected by multiple sensors. The air-condition ECU 34 is provided with an air-conditioning control module (ACCM) 35 which performs controls relevant to the compressor 31. For example, the air-condition ECU 34 detects the thermal energy accumulated in the cool storage 32. The air-condition ECU 34 controls the compressor 31 so that the accumulated thermal energy approaches a predetermined target thermal energy.

Furthermore, the air-condition ECU 34 controls the compressor 31 to restrict the fuel quantity consumed due to a generation of thermal energy. The air-condition ECU 34 controls the compressor 31 based on the fuel consumption associated data in order to restrict the fuel consumption. The air-condition ECU 34 executes control processings based on the fuel consumption associated data transmitted from the engine control unit 13. The air-condition ECU 34 uses the fuel consumption for generating the heat energy as an index for restricting the fuel consumption due to the generation of heat energy. The fuel consumption for generating the heat energy is referred to as a heat-generation fuel consumption. The heat-generation fuel consumption represents a fuel quantity which is consumed for generating unit heat energy. For example, when a unit of the heat energy is "kilowatt-hour (kWh)" and a unit of the fuel consumption is "gram (g)", the heat-generation fuel consumption TC can be expressed as follows:

$$TC = g/kWh$$

In the following description, the heat-generation fuel consumption is referred to as a heat-consumption TC. In the present embodiment, the cold energy generation is referred to as the heat generation.

The engine control unit 13, the electric power ECU 24 and the air-condition ECU 34 are electronic control units (ECU). Each of these electronic control units includes a microcomputer having a memory media. The memory media stores various programs which the computer executes. The memory media is a semiconductor memory or a magnetic disc.

The engine control unit 13, the electric power ECU 24 and the air-condition ECU 34 are electrically connected to each other through a communication line 3. The communication line 3 is referred to as Controller Area Network (CAN) or Local Interconnect Network (LIN).

The engine control module 14 controls the engine 11 based on the fuel consumption data in order to restrict the fuel consumption. Furthermore, the engine control module 14 has a transmitting part which transmits offers the fuel consumption associated data relevant to the fuel consumption data toward another ECU 24, 34 through the communication line 3. The fuel consumption associated data is the fuel consumption data itself and/or another data which is made based on the fuel consumption associated data. In the present embodiment, the fuel consumption data itself is transmitted to other control modules 25 and 35 from the engine control module 14.

Figure 2:
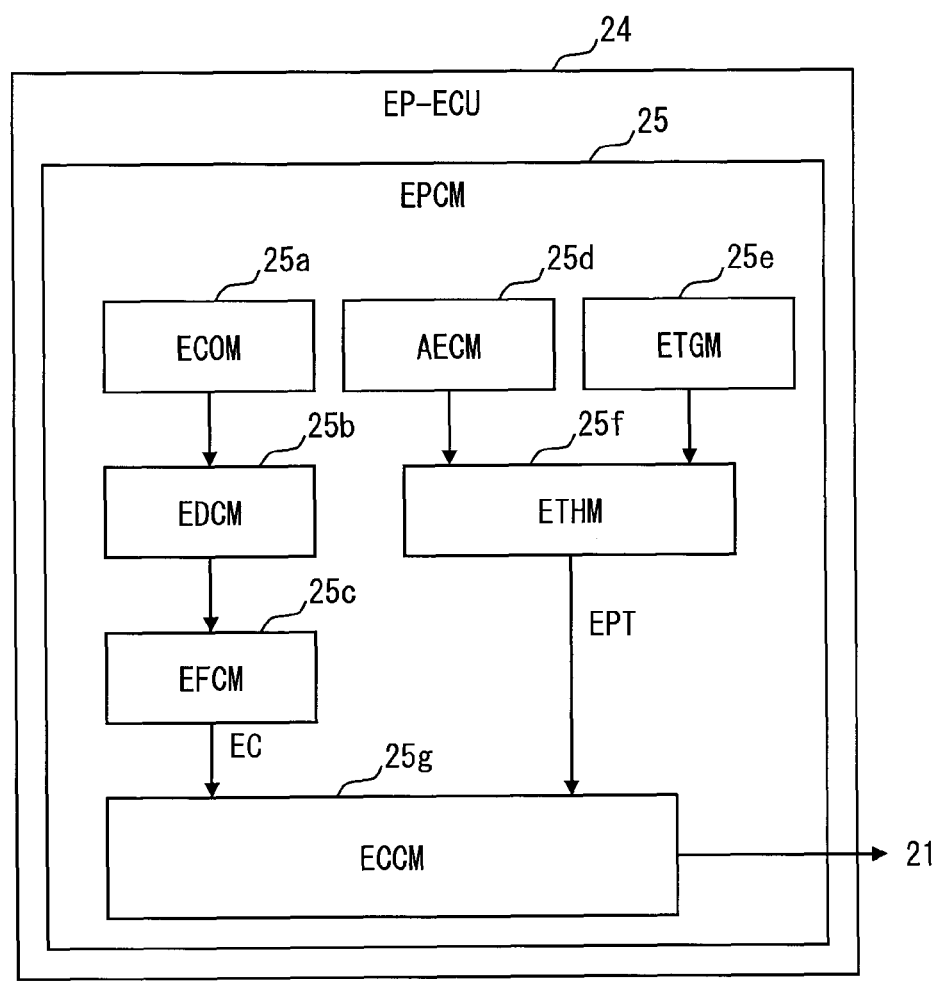
FIG. 2 is a block diagram showing an electric power ECU according to the first embodiment.
Figure 3:
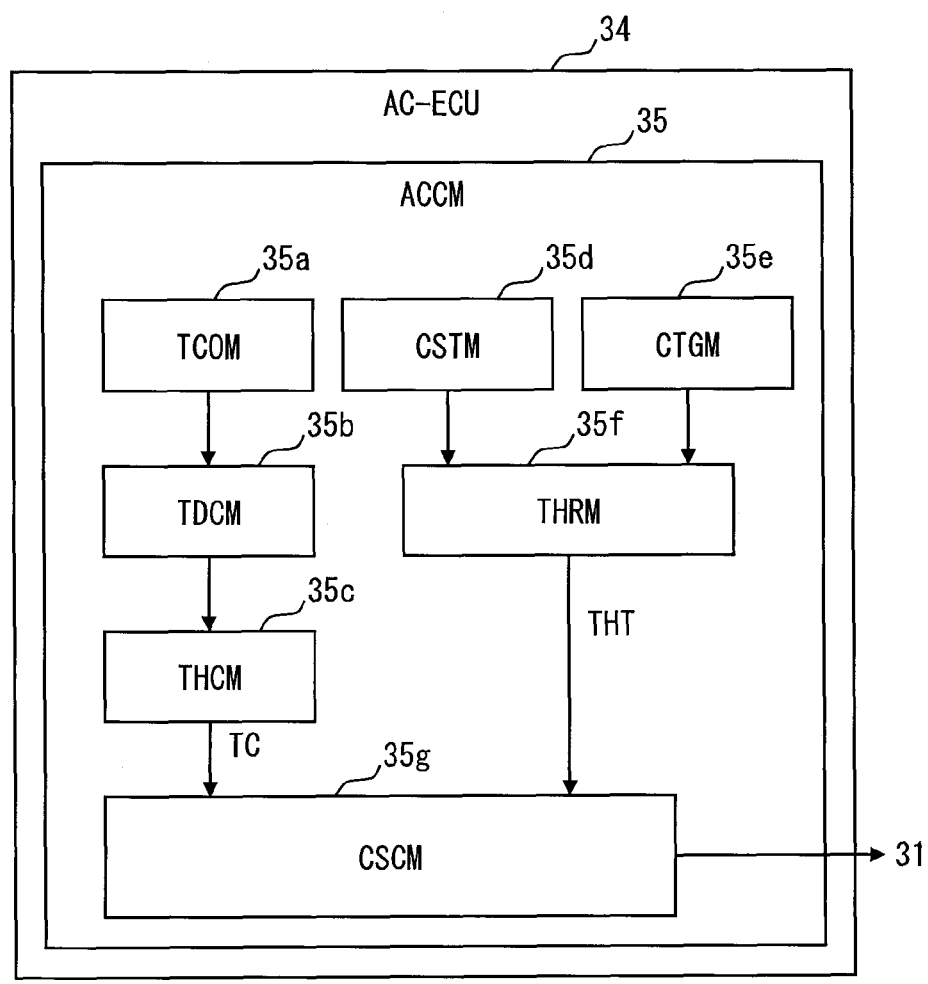
FIG. 3 is a block diagram showing an air-condition ECU according to the first embodiment.

As shown in FIG. 2, the electric power control module 25 is provided with an electric communication module (ECOM) 25a, a fuel-consumption computation module (EDCM) 25b and an electricity-consumption computation module (EFCM) 25c. The electric communication module 25a receives the fuel consumption data transmitted from the engine control module 14. The fuel-consumption computation module 25b computes power control data required to control the power supply system 20 based on fuel consumption data and the driving condition of the engine 11. The power control data includes the present fuel consumption, that is, the present fuel consumption rate.

The electricity-consumption computation module 25c computes the fuel quantity consumed by the power supply system 20, that is, the electricity-consumption EC. It should be noted that the electricity-consumption EC is a value in a case that the generator 21 generates the electricity and an operation mode of the generator 21 is varied. For example, the electricity-consumption EC(n) is computed for each of operation modes of the generator 21. It should be noted that "n" represents the number of the operation mode of the generator 21. For example, the output voltage of the generator 21 is varied in each operation mode.

The electricity-consumption EC which the electricity-consumption computation module 25c computes can be a difference in fuel consumption rate between a case where the generator 21 generates no electricity and a case where the generator 21 generates electricity. In this case, the electricity-consumption EC represents an increase in fuel consumption rate caused by increasing the generation of the electricity.

The electric power control module 25 is provided with an actual value computation module (AECM) 25d, a target value computation module (ETGM) 25e and a determination-electricity-consumption computation module (ETHM) 25f. The actual value computation module 25d computes the current actual charging rate of the battery 22. The target value computation module 25e computes a target charging rate of the battery 22 based on the conditions of the electric load 23. The charging rate of the battery 22 can be expressed by the electric energy charged in the battery 22 or a ratio of current charged electric energy relative to the fully charged electric energy.

The determination-electricity-consumption computation module 25f sets a determination-electricity-consumption EPT based on the current actual charging rate and the target charging rate of the battery 22. The determination-electricity-consumption EPT is a threshold for determining whether the generator 21 is OFF or ON. The determination-electricity-consumption EPT is established in such a manner as to restrict a deterioration in fuel consumption rate due to the generation of electrical energy. Also, the determination-electricity-consumption EPT is established in such a manner that the generator 21 tends to be turned ON when a difference between the current actual charging rate and the target charging rate is larger. Thereby, it is restricted that the charging rate of the battery 22 runs shortage. Also, the determination-electricity-consumption EPT is established in such a manner that an operation of the generator 21 is restricted when a difference between the current actual charging rate and the target charging rate is smaller. Thereby, it is restricted that the fuel consumption rate is increased.

An electric charging ratio ECR can be obtained based on the current actual charging rate and the target charging rate.

ECR=Actual Charging Rate/Target Charging Rate

The determination-electricity-consumption EPT can be established based on the electric charging ratio ECR. As the electric charging ratio ECR becomes higher, the determination-electricity-consumption EPT is established smaller. That is, as the charging rate of the battery 22 is higher, the determination-electricity-consumption EPT is established smaller. In other words, as the charging rate of the battery is more increased, the generator 21 tends to be less operated. As a result, it is restricted that the electricity-consumption is increased.

A charging control module (ECCM) 25g determines whether the electricity should be generated by the generator 21 based on the electricity-consumption EC and the determination-electricity-consumption EPT. Therefore, the charging control module 25g functions as a determination module which determines whether the generator 21 is turned ON. Furthermore, the charging control module 25g selects an operation mode of the generator 21 in such a manner as to restrict an increased in electricity-consumption EC. The charging control module 25g controls the generator 21. For example, the charging control module 25g adjusts the control voltage of the generator 21. As a result, the driving torque GTQ for driving the generator 21 is varied. Generally, as the control voltage becomes higher, the driving torque GTQ for generating electrical energy is more increased.

As shown in FIG. 2, the air-conditioning control module (ACCM) 35 is provided with an electric communication module (TCOM) 35a, a fuel-consumption computation module (TDCM) 35b and a fuel-consumption computation module (THCM) 35c. The electric communication module 35a receives the fuel consumption data transmitted from the engine control module 14. The fuel-consumption computation module 35b computes heat control data required to control the heat system 30 based on fuel consumption data and the driving condition of the engine 11. The heat control data includes the present fuel consumption, that is, the present fuel consumption rate.

The heat-consumption computation module 35c computes the fuel quantity consumed by the heat system 30, that is, the heat-consumption TC. It should be noted that the heat-consumption TC is a value in a case that the compressor 31 generates the thermal energy. Furthermore, the heat-consumption TC is computed when an operation mode of the compressor 31 is varied. For example, the heat-consumption TC(n) is computed for each of operation modes of the compressor 31. It should be noted that "n" represents the number of the operation mode of the compressor 31. For example, the heat-consumption TC(n) is computed when a discharge volume of the compressor 31 is varied.

The heat-consumption TC which the heat-consumption computation module 35c computes can be a difference in fuel consumption rate between a case where the compressor 31 generates no thermal energy and a case where the compressor 31 generates the thermal energy. In this case, the heat-consumption TC represents an increase in fuel consumption rate caused by increasing the generation of the thermal energy.

The air-conditioning control module 35 is provided with an actual value computation module (CSTM) 35d, a target value computation module (CTGM) 35e and a determination-heat-consumption computation module (THRM) 35f. The actual value computation module 35d computes the current thermal energy accumulated in the cool storage 32. The target value computation module 35e computes a target thermal energy accumulated in the cool storage 32 based on the conditions of the air-conditioner 33. The thermal energy can be expressed by the thermal energy accumulated in the cool storage 32 or a ratio of current accumulated thermal energy relative to the fully accumulated thermal energy.

The determination-heat-consumption computation module 35f sets a determination-heat-consumption THT based on the actual accumulated thermal energy and the target thermal energy. The determination-heat-consumption THT is a threshold for determining whether the compressor 31 is OFF or ON. The determination-heat-consumption THT is established in such a manner as to restrict a deterioration in fuel consumption rate due to the generation of thermal energy. Also, the determination-heat-consumption THT is established in such a manner that the compressor 31 tends to be turned ON when a difference between the actual accumulated thermal energy and the target thermal energy is larger. Thereby, it is restricted that the accumulated thermal energy runs shortage. Also, the determination-heat-consumption THT is established in such a manner that an operation of the compressor 31 is restricted when a difference between the actual accumulated thermal energy and the target thermal energy is smaller. Thereby, it is restricted that the fuel consumption rate is increased.

A thermal accumulate ratio CCR can be obtained based on the actual accumulated thermal energy and the thermal energy.

CCR=Actual Accumulated Thermal Energy/Target Thermal Energy

The determination-heat-consumption THT can be established based on the thermal accumulate ratio CCR. As thermal accumulate ratio CCR becomes higher, the determination-heat-consumption THT is established smaller. That is, as the thermal energy accumulated in the cool storage 32 is larger, the determination-heat-consumption THT is established lower. In other words, as the thermal energy accumulated in the cool storage 32 is more increased, the compressor 31 tends to be less operated. As a result, it is restricted that the feat-consumption is increased.

A heat control module (CSCM) 35g determines whether the thermal energy should be generated by the compressor 31 based on the heat-consumption TC and the determination-heat-consumption THT. Therefore, the heat control module 35g functions as a determination module which determines whether the compressor 31 is turned ON. Furthermore, the heat control module 35g selects an operation mode of the compressor 31 in such a manner as to restrict an increased in heat-consumption TC. The heat control module 35g controls the compressor 31. For example, the heat control module 35g adjusts the discharge volume of the compressor 31. As a result, the driving torque CTQ for driving the compressor 31 is varied. Generally, as the discharge volume of the compressor 31 becomes larger, the driving torque CTQ for generating the heat energy is more increased.

Figure 4:
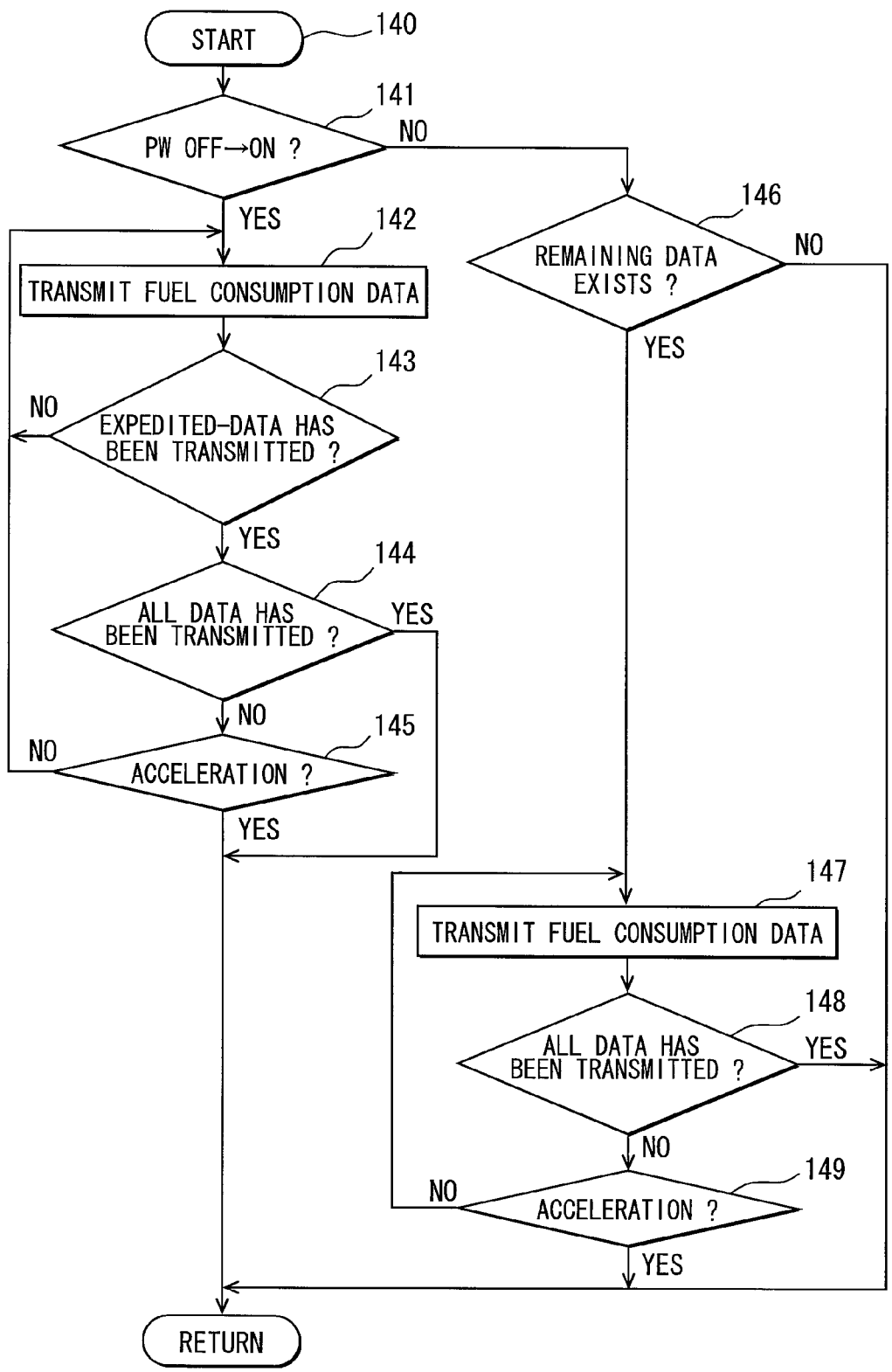
FIG. 4 is a flowchart illustrating processing steps which an engine control unit executes.

FIG. 4 is a flowchart showing a transmitting processing 140 of the fuel consumption associated data which the engine control module 14 executes. In the present embodiment, all of the fuel consumption data is transmitted from the engine control unit 13 and is copied into other units. According to this configuration, the original fuel consumption data is stored only in the engine control unit 13.

Therefore, the fuel consumption data stored in the engine control unit 13 is rewritten, whereby the fuel consumption data which the other control units 24, 34 utilize can be rewritten.

The fuel consumption data can be used as a fuel consumption map which is established according to a driving condition of the engine 11. Since the driving condition of the engine 11 changes variously, the fuel consumption map includes multiple maps.

For example, the fuel consumption data can include a fuel consumption map for a warming-up state of immediately after the engine 11 is started, and the fuel consumption map for the idling condition after warming-up. Further, the fuel consumption data can include the fuel consumption map for an acceleration state of the engine 11, the fuel consumption map for a high-speed state of the engine 11, and a fuel consumption map for a deceleration state of the engine 11.

Although all of the fuel consumption data is transmitted and copied, a part of the data is transmitted and copied in preference to the other data. The fuel consumption data is divided into multiple portions. One of the multiple portions is transmitted and copied in preference to the other portions that will be transmitted and copied later. Thereby, even immediately after the system 1 is activated, the appropriate control can be executed based on the fuel consumption data.

The expedited-data portion corresponds to the fuel consumption data which the systems 20 and 30 need immediately after the engine 11 is started. For example, the expedited-data portion can include the fuel consumption data which is used during a period from several milliseconds to several seconds immediately after the engine 11 is started. For example, the expedited-data portion can include the fuel consumption map for a warming-up state of immediately after the engine 11 is started, and the fuel consumption map for an idling condition after warming-up.

The expedited-data portion can correspond to an engine speed range for practical use of the engine 11. For example, the fuel consumption map corresponding to the engine speed range less than or equal to 1000 rpm can be used as the expedited-data portion. In this case, the fuel consumption map for practical use is transmitted and copied in preference to the other maps which will be transmitted later without excessively increasing a processing load of the engine control unit 13. Thus, the fuel consumption map for practical use can be transmitted in a short period.

In step 141, the engine control module 14 determines whether it is immediately after the system 1 is activated. Immediately after the system 1 is activated, an initial processing is performed in a control device of the system 1. That is, in step 141, a determination of whether the initial processing should be performed is made. For example, it is determined whether a power switch PW of the system 1 is turned ON from OFF. When the answer is YES in step 141, the procedure proceeds to step 142. When the initial processing was completed, the procedure proceeds to step 146.

In step 142, the expedited-data portion is transmitted through a packet telecommunication which the communication line 3 permits. In step 143, the engine control module 14 determines whether a transmission of the expedited-data portion has been completed. The processing of step 142 is repeated until the transmission of the expedited-data portion is completed. The processings in steps 142 to 143 are initial transmitting processings for transmitting the expedited-data portion.

In step 144, the engine control module 14 determines whether the transmission of all fuel consumption data has been completed. When all of the fuel consumption data has been transmitted, the transmitting processing ends. In step 145, the engine control module 14 determines whether the engine 11 is brought into an acceleration state. When the engine 11 is brought into the acceleration state after transmitting the expedited-data portion, the engine control module 14 stops the transmitting processing temporarily so that the control processing of the engine 11 is accelerated.

In step 146, the engine control module 14 determines whether remaining fuel consumption data exists. When no remaining fuel consumption data exists, the transmitting processing ends. When remaining fuel consumption data exists, the procedure proceeds to step 147.

Steps 147 to 149 are processings for transmitting the remaining fuel consumption data that was not able to be transmitted during the initial processing. In step 147, the fuel consumption data is transmitted. In step 148, the engine control module 14 determines whether the transmission of all fuel consumption data has been completed. When all of the fuel consumption data has been transmitted, the transmitting processing ends. In step 149, the engine control module 14 determines whether the engine 11 is brought into an acceleration state. When the engine 11 is brought into the acceleration state, the engine control module 14 stops the transmitting processing temporarily so that the control processing of the engine 11 is accelerated.

Figure 5:
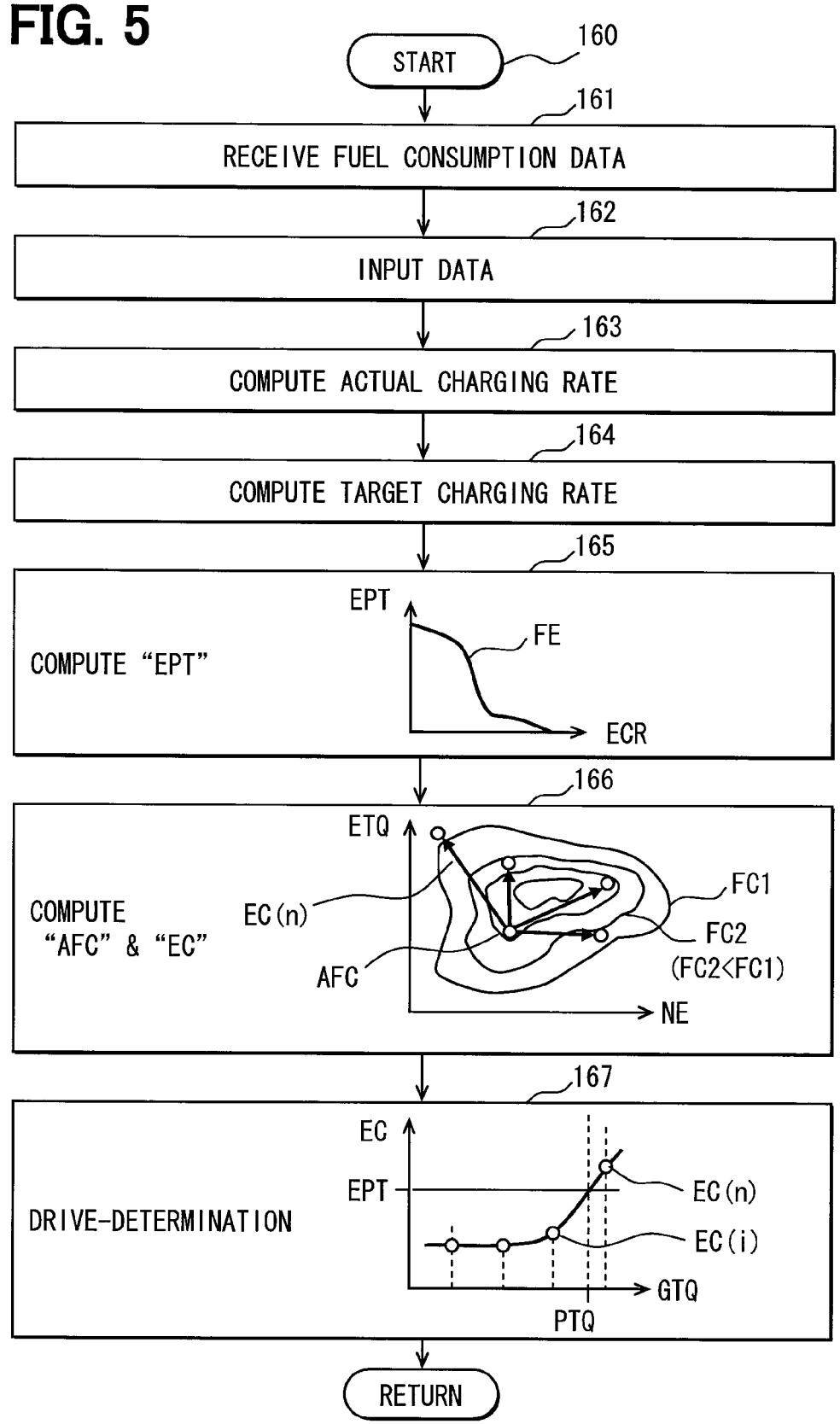
FIG. 5 is a flowchart illustrating processing steps which an electric power ECU executes, according to the first embodiment.

FIG. 5 is a flowchart showing an electric power control processing 160 which the electric power control module 25 executes. In the electric power control processing 160, the electric power control module 25 receives the fuel consumption data transmitted from the engine control module 14. The generator 21 is controlled to restrict the electricity-consumption based on the received fuel consumption data.

In step 161, an electric power control module 25 receives the fuel consumption data. The received fuel consumption data is stored in a memory of the electric power ECU 24. In step 162, an electric power control module 25 inputs data required for a power control. For example, the electric voltage and current of the battery 22 are inputted to the electric power control module 25. Furthermore, in step 162, in order to execute the processing based on the fuel consumption data, the data representing the driving condition of the engine 11 is inputted. For example, the data representing the engine speed NE and the engine torque ETQ are inputted.

In step 163, the electric power control module 25 computes an actual charging rate of the battery 22. In step 164, the electric power control module 25 computes a target charging rate of the battery 22. In step 165, the electric power control module 25 computes the determination electricity-consumption EPT. The electric charging ratio ECR is computed based on the current actual charging rate and the target charging rate. Furthermore, the determination electricity-consumption EPT is computed based on the electric charging ratio ECR and a predetermined map or function FE.

In step 166, the electric power control module 25 computes the fuel consumption AFC. The current fuel consumption AFC is computed based on the fuel consumption data transmitted from the engine control unit 13. The current fuel consumption AFC can be obtained from a fuel consumption map based on the engine speed NE and the engine torque ETQ.

The fuel consumption map in step 166 can be expressed by a contour line representing the fuel consumption FC as shown in FIG. 5. In this map, the fuel consumption shown by the contour-line FC1 is larger than that shown by the contour-line FC2 (FC1>FC2).

In step 166, the electric power control module 25 computes the electricity-consumption EC. It should be noted that multiple electricity-consumption EC(n) corresponding to multiple operation modes of the generator 21 are computed. The Electricity-consumption EC can be expressed as a difference between the current fuel consumption and the fuel consumption at when the generator 21 is operated.

In step 167, the electric power control module 25 executes a drive-determination for the generator 21. The electric power control module 25 compares the electricity-consumption EC(n) computed in step 166 with the determination electricity-consumption EPT. The electric power control module 25 determines whether the operation mode of the generator 21 exists so that an increase in fuel consumption rate can be restricted.

When the of electricity-consumption EC indicates that the fuel consumption rate increases, the electric power control module 25 defines the electricity-consumption EC(n) which is less than the determination electricity-consumption EPT. The electric power control module 25 defines the operation mode of the generator 21 where the electricity-consumption EC(n) can be less than the determination electricity-consumption EPT. Then, the electric power control module 25 operates the generator 21 at the defined operation mode. When all of the electricity-consumption EC(n) exceeds the determination electricity-consumption EPT, the generator 21 is not driven.

In step 167 as shown in FIG. 5, a relationship between the driving torque GTQ of the generator 21 and the electricity-consumption EC is illustrated by a solid line. The generator is controlled in such a manner that the driving torque GTQ is less than the allowable torque PTQ, whereby the electricity-consumption EC is less than the determination electricity-consumption EPT. For example, the generator 21 is driven at the operation mode in which the electricity-consumption EC(i) is obtained. As a result, an excessive increase in electricity-consumption can be restricted.

Figure 6:
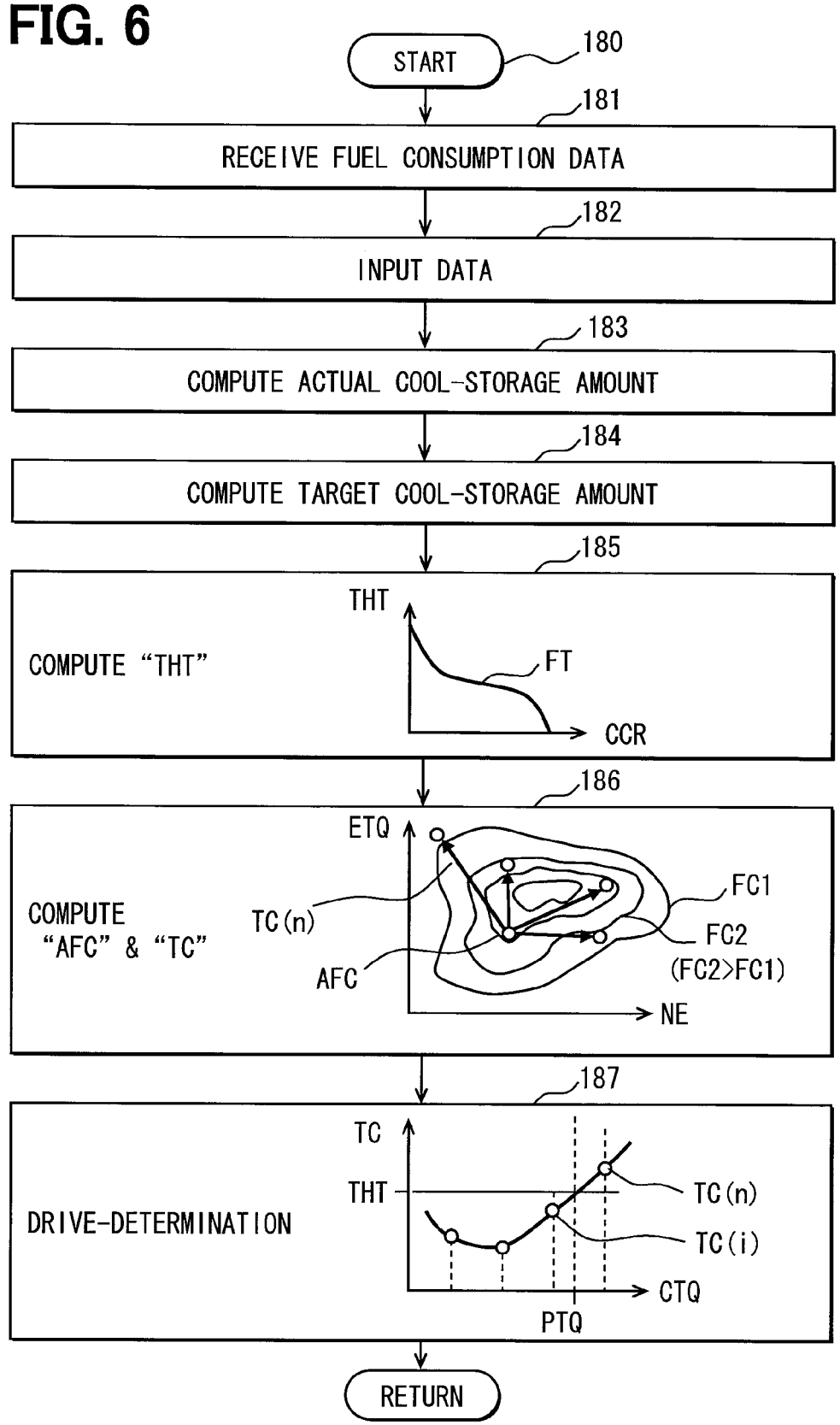
FIG. 6 is a flowchart illustrating processing steps which the air-condition ECU executes, according to the first embodiment.

FIG. 6 is a flowchart showing a heat control processing 180 which the air-conditioning control module 35 executes. In the heat control processing 180, the air-conditioning control module 35 receives the heat consumption data transmitted from the engine control module 14. The compressor 31 is controlled to restrict the heat-consumption based on the received heat consumption data.

In step 181, the air-conditioning control module 35 receives the fuel consumption data. The received fuel consumption data is stored in a memory of the air-condition ECU 34. In step 182, the air-conditioning control module 35 inputs data required for a cool storage control. For example, the temperature and the thermal capacity indicating a cool-storage condition of the cool storage 32 are inputted to the air-conditioning control module 35. Furthermore, in step 182, in order to execute the processing based on the fuel consumption data, the data representing the driving condition of the engine 11 is inputted. For example, the data representing the engine speed NE and the engine torque ETQ are inputted.

In step 183, the air-conditioning control module 35 computes an actual cool-storage amount of the cool storage 32. In step 184, the air-conditioning control module 35 computes a target cool-storage amount of the cool storage 32. In step 185, the air-conditioning control module 35 computes the determination heat-consumption THT. A cool-storage ratio CCR is computed based on the cool-storage amount and the target cool-storage amount. Furthermore, the determination heat-consumption THT is computed based on the cool-storage ratio CCR and a predetermined map or function FT.

In step 186, the air-conditioning control module 35 computes the fuel consumption AFC. The current fuel consumption AFC is computed based on the fuel consumption data transmitted from the engine control unit 13.

Further, in step 166, the air-conditioning control module 35 computes the heat-consumption TC. It should be noted that multiple heat-consumption TC(n) corresponding to multiple operation modes of the compressor 31 are computed. The heat-consumption TC can be expressed as a difference between the current fuel consumption and the fuel consumption at when the compressor 31 is operated.

In step 187, the air-conditioning control module 35 executes a drive-determination for the compressor 31. The air-conditioning control module 35 compares the heat-consumption TC(n) computed in step 186 with the determination heat-consumption THT. The air-conditioning control module 35 determines whether the operation mode of the compressor 31 exists so that an increase in fuel consumption rate can be restricted.

When the heat-consumption TC indicates that the fuel consumption rate increases, the air-conditioning control module 35 defines the heat-consumption TC(n) which is less than the determination heat-consumption THT. The air-conditioning control module 35 defines the operation mode of the compressor 31 where the heat-consumption TC(n) can be less than the determination heat-consumption THT. Then, the air-conditioning control module 35 operates the compressor 31 at the defined operation mode. When all of the heat-consumption TC(n) exceeds the determination heat-consumption THT, the compressor 31 is not driven.

In step 187 as shown in FIG. 6, a relationship between the driving torque CTQ of the compressor 31 and the heat-consumption TC is illustrated by a solid line. The compressor 31 is controlled in such a manner that the driving torque CTQ is less than the allowable torque PTQ, whereby the heat-consumption TC is less than the determination heat-consumption THT. For example, the compressor 31 is driven at the operation mode in which the heat-consumption TC(i) is obtained. As a result, an excessive increase in heat-consumption for driving the compressor 31 can be restricted.

According to the embodiment described above, the original fuel consumption data is stored in the engine control unit 13 only. The electric power ECU 24 and the air-condition ECU 34 receive the fuel consumption data transmitted from the engine control unit 13 and store them therein. Thus, by updating the original fuel consumption data stored in the engine control unit 13, the fuel consumption data stored in the ECU 24 and 34 can be updated. Therefore, the energy management system can easily respond to the change of the fuel consumption associated data. The fuel consumption associated data can be intensively managed.

As a result, the alteration of the fuel consumption associated data can be easily conducted, whereby serviceability is improved. Moreover, an increase in hardware and software for rewriting the fuel consumption associated data can be restricted. Moreover, since the computing process regarding to the fuel consumption can be centralized, an increase of an input circuit and the computing treatment can be restricted. The control units do not depend on a difference of the fuel consumption associated data.

The electric power ECU 24 and the air-condition ECU 34 do not depend on the fuel consumption data for a specific engine. Thus, the ECU 24 and the ECU 34 can be applied to a various type of engines and vehicles. The versatility can be improved.

According to the present embodiment, the energy consumption system is driven by the engine 11 and is provided with the power supply system 20 including the generator 21 and the heat system 30 including the compressor 31. Further, the power supply system 20 is provided with an electric power ECU 24 and the heat system 30 is provided with the air-condition ECU 34. Thus, the alteration of the fuel consumption associated data can be easily applied to the power supply system 20 and the heat system 30.

The fuel consumption associated data is established in view of the driving condition of the engine 11 as the parameter. The fuel consumption associated data includes a fuel consumption map by which the fuel consumption can be retrieved based on the parameters. Thus, the fuel consumption of the engine 11 can be computed based on the fuel consumption map.

According to the present embodiment, the engine control unit 13 is provided with an expedited-data transmitting portion which executes the processes in steps 142 to 145 where the expedited-data portion is transmitted to the devices in preference to the other portions. Further, the engine control unit 13 is provided with a remaining-data transmitting portion which executes the processes in steps 146 to 149 where the remaining-data portion is transmitted to the devices after the expedited-data portion is transmitted. The expedited-data portion can be transmitted in a short time period. For example, the expedited-data portion is a data portion which is needed immediately after the engine 11 is turned ON. The control units can be properly controlled in a short period even immediately after the engine 11 is turned ON.

[Second Embodiment]

In the above described first embodiment, whole of the fuel consumption data was copied. In a second embodiment, only the processed data generated based on the fuel consumption data is transmitted to the control modules 25 and 35 from the engine control module 14.

Based on the fuel consumption data, the engine control module 14 computes the processed data with respect to the fuel consumption required to control the power supply system 20 so that the fuel consumption is restricted. The processed data computed in the engine control module 14 is transmitted to the electric power control module 25. The electric power control module 25 controls the power supply system 20 based on the processed data without using the fuel consumption data itself.

Further, based on the fuel consumption data, the engine control module 14 computes the processed data with respect to the fuel consumption required to control the heat system 30 so that the fuel consumption is restricted. The processed data computed in the engine control module 14 is transmitted to the air-conditioning control module 35. The air-conditioning control module 35 controls the heat system 30 based on the processed data without using the fuel consumption data itself.

In the present embodiment, data volume of the processed data transmitted from the engine control module 14 is clearly smaller than that of the fuel consumption data. Although the fuel consumption data can be retrieved, the processed data corresponds to a threshold. Moreover, although the fuel consumption data is fixed data, the processed data is variable data which varies according to the driving condition of the engine 11. The processed data is one of fuel consumption associated data. Also in the present embodiment, the fuel consumption data itself is stored as a fuel consumption map.

Figure 7:
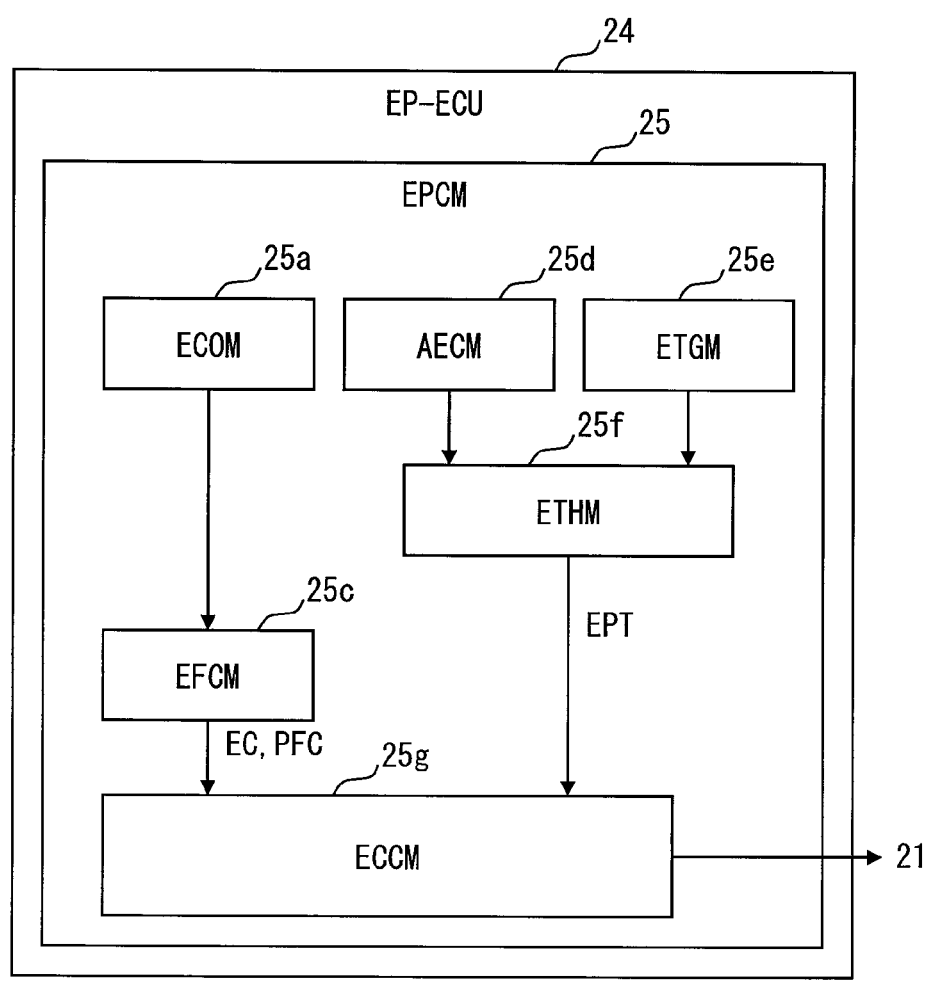
FIG. 7 is a block diagram showing an electric power ECU according to a second embodiment.
Figure 8:
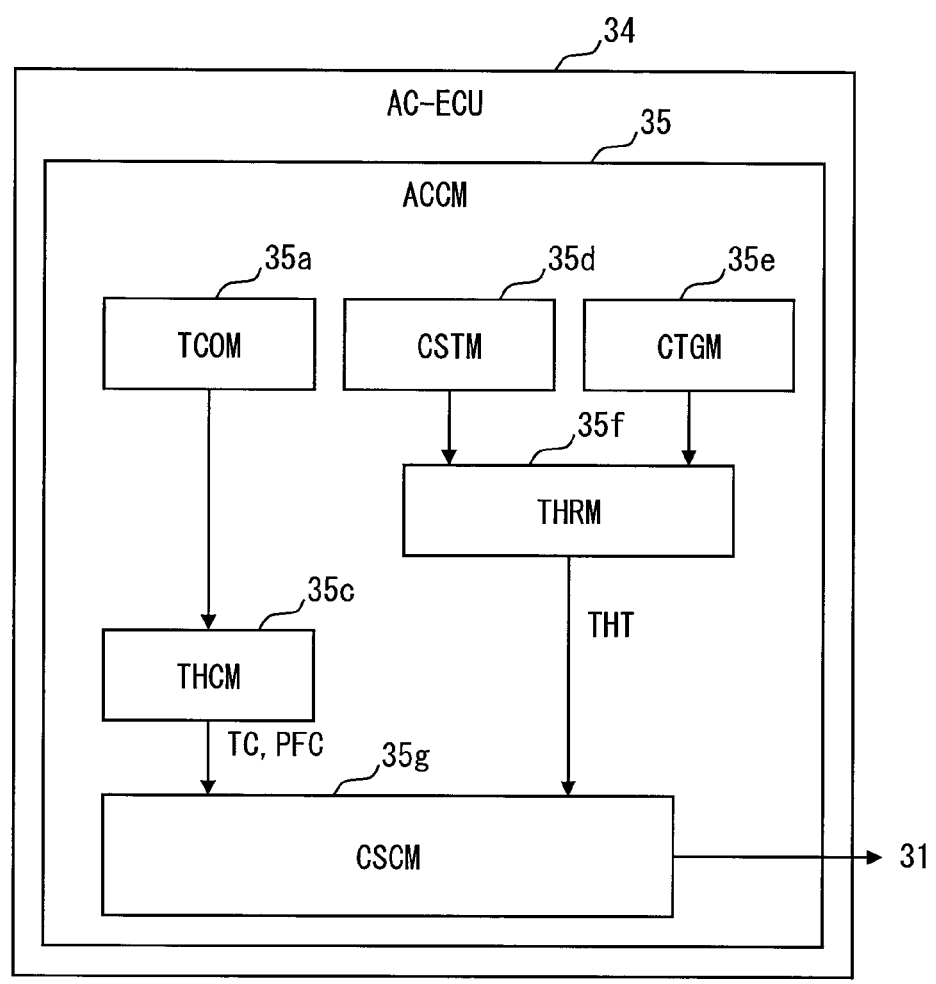
FIG. 8 is a block diagram showing an air-condition ECU according to the second embodiment.

FIG. 7 shows an electric power ECU 24 in which the electric power control module 25 is not provided with the fuel consumption computation portion. The electric communication module 25a receives the processed data transmitted from the engine control module 14. The processed data includes a current fuel consumption AFC and an allowable fuel consumption PFC. The electric power control module (EPCM) 25 is provided with the electricity-consumption computation portion (EFCM) 25c, the actual value computation module (AECM) 25d, the target value computation module (ETGM) 25e and the determination-electricity-consumption computation module (ETHM) 25f, as well as the first embodiment.

A charging control module (ECCM) 25g determines whether the electricity should be generated by the generator 21 based on the electricity-consumption EC and the allowable fuel consumption PFC. The charging control module (ECCM) 25g selects one of the allowable fuel consumption PFC and the determination electricity-consumption EPT, which has less fuel consumption rate. Furthermore, the charging control module (ECCM) 25g determines whether the generator 21 should be driven based on a comparison between the allowable fuel consumption PFC or the determination electricity-consumption EPT and the electricity-consumption EC computed by the electricity-consumption computation portion (EFCM) 25c. Furthermore, the charging control module 25g selects the operation mode of the generator 21 in such a manner as to restrict an increased in electricity-consumption EC.

FIG. 7 shows an air-condition ECU 34 in which the heat control module 35 is not provided with the heat consumption computation portion. The electric communication module 35a receives the processed data transmitted from the engine control module 14. The processed data includes a current fuel consumption AFC and an allowable fuel consumption PFC. The heat control module 35 is provided with the heat-consumption computation module 35c, the actual value computation module (CSTM) 35d, the target value computation module (CTGM) 35e and the determination-heat-consumption computation module (THRM) 35f, as well as the first embodiment.

The cool storage control portion (CSCM) 35g determines whether the compressor 31 should be driven based on the heat-consumption TC, the allowable fuel consumption PFC and the determination heat-consumption THT. The cool storage control module 35g selects one of the allowable fuel consumption PFC and the determination heat-consumption THT, which has less fuel consumption rate. Furthermore, the cool storage control module 35g determines whether the compressor 31 should be driven based on a comparison between the allowable fuel consumption PFC or the determination heat-consumption THT and the heat-consumption TC computed by the heat-consumption computation module 35c. Furthermore, the cool storage control module 35g selects the operation mode of the compressor 31 in such a manner as to restrict an increased in heat-consumption TC.

Figure 9:
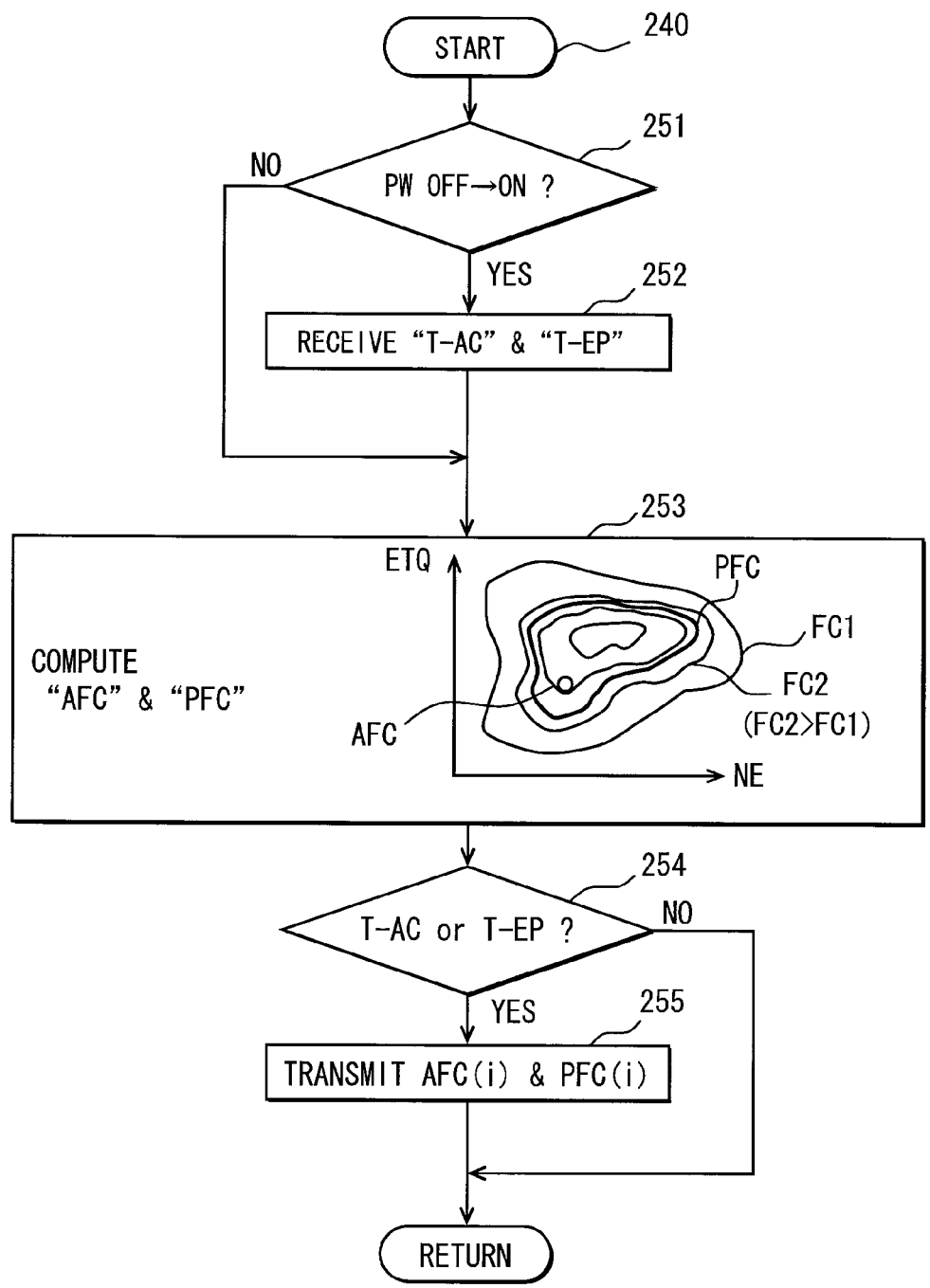
FIG. 9 is a flowchart illustrating processing steps which an engine control unit executes according to the second embodiment.

FIG. 9 is a flowchart showing a transmitting processing 240 of the fuel consumption associated data which the engine control module 14 executes. In the present embodiment, only the processed data is transmitted from the engine control unit 13 and is copied into other units. According to this configuration, the original fuel consumption data is stored only in the engine control unit 13. Therefore, the fuel consumption data stored in the engine control unit 13 is rewritten, whereby the control processings which the other control units 24, 34 execute can be altered.

In the present embodiment, in order to appropriately update the processed data, a cycle for updating processed data by a communication between the engine control unit 13 and other control units 24 and 34 is established.

The process in step 251 is the same as the process in step 141 that is described above. When the answer is YES in step 251, the procedure proceeds to step 252. When the initial processing was completed, the procedure proceeds to step 253.

In step 252, the engine control module 14 receives the communication cycles T-EP and T-AC transmitted from the control units 24 and 34.

In step 253, the engine control module 14 computes the processed data which will be transmitted. Specifically, a current fuel consumption AFC and an allowable fuel consumption PFC are computed. The current fuel consumption AFC is utilized for computing the electricity-consumption EC and/or the heat-consumption TC. The allowable fuel consumption PFC is established based on the current fuel consumption AFC. The allowable fuel consumption PFC represents an increase in fuel consumption rate which can be acceptable. The fuel consumption contour line corresponding to the allowable fuel consumption PFC is illustrated by a thick solid line.

In step 254, the engine control module 14 determines whether it is a time of the communication cycle. When the answer is NO in step 254, the procedure proceeds to step 709. When the answer is NO in step 702, the procedure returns to step 251.

In step 255, the engine control module 14 transmits the data computed in step 253 to the control units 24 and 34. Specifically, the current fuel consumption AFC(i) and the current allowable fuel consumption PFC(i) are transmitted. As a result, the current fuel consumption AFC(i) and the current allowable fuel consumption PFC(i) are updated in the communication cycle.

According to the above configuration, the communication cycle is established at a time of the initial processing immediately after the system 1 is activated. While the system 1 has been activated continuously, the processed data is updated periodically.

The processed data includes a current fuel consumption AFC. Thus, the electric power ECU 24 and the air-condition ECU 34 can receive and utilize the present fuel consumption AFC representing the current fuel consumption of the engine 11. Moreover, the processed data includes the allowable fuel consumption PFC for determining whether the generator 21 and/or the compressor 31 can be driven. Thus, the electric power ECU 24 and/or the air-condition ECU 34 receives the allowable fuel consumption PFC, whereby it can be determined whether the generator 21 and/or the compressor 31 can be driven.

Figure 10:
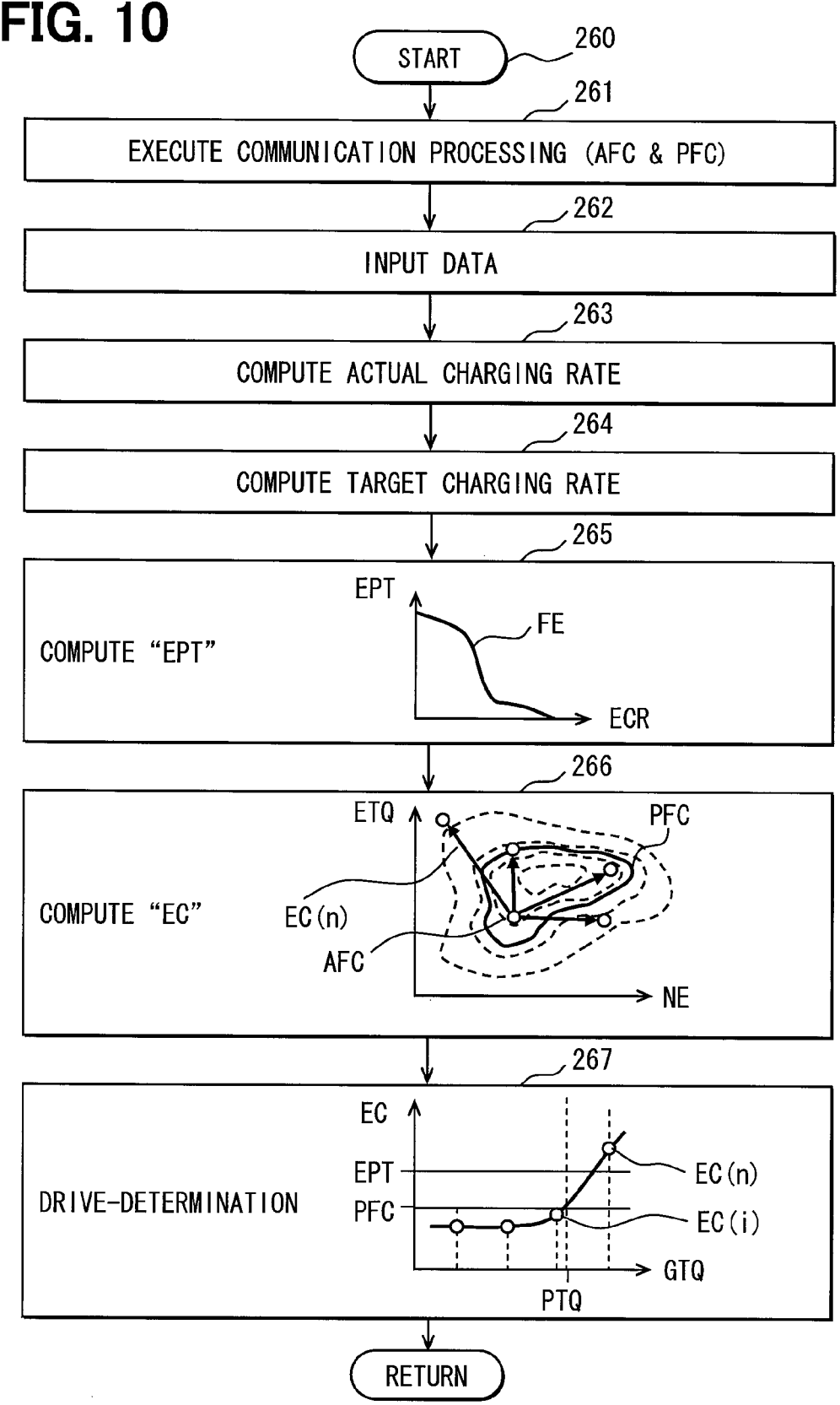
FIG. 10 is a flowchart illustrating processing steps which an electric power ECU executes according to the second embodiment.

FIG. 10 is a flowchart showing an electric power control processing 260 which the electric power control module 25 executes. In the electric power control processing 260, the electric power control module 25 receives the processed data transmitted from the engine control module 14. The generator 21 is controlled to restrict the electricity-consumption based on the received processed data.

In step 261, the electric power control module 25 executes the communication processing. Specifically, the communication cycle preferable for the power control is transmitted. Furthermore, the processed data is received.

Figure 11:
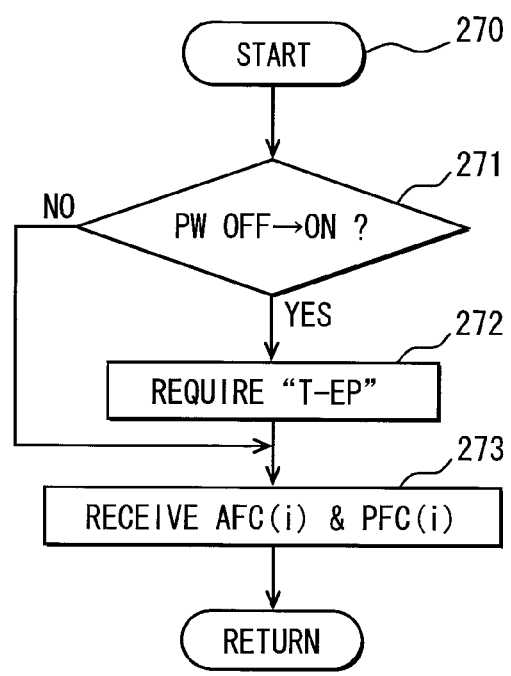
FIG. 11 is a flowchart illustrating a part of processing steps which the electric power ECU executes according to the second embodiment.

In step 271 of FIG. 11, the electric power control module 25 determines whether the power switch PW is turned ON from OFF, that is, whether it is an initial state. When the answer is YES in step 271, the procedure proceeds to step 272. In step 272, the electric power control module 25 transmits the communication cycle T-EP to the engine control module 14. The communication cycle T-EP is an update cycle of the processed data. The communication cycle T-EP is established as a preferable cycle for performing the power control appropriately. According to the above configuration, a communication cycle is required from an electric power control module 25 to the engine control module 14. Thus, the communication cycle preferable for appropriately executing the power control is established. In step 273, an electric power control module 25 receives the processed data.

Referring back to FIG. 10, in step 262, an electric power control module 25 inputs data required for a power control. For example, the electric voltage and current of the battery 22 are inputted to the electric power control module 25. The data representing the engine speed NE and the engine torque ETQ are not inputted in step 262. The electric power ECU 24 can be configured without an interface for inputting the engine speed NE and/or the engine torque ETQ.

The processes in steps 263 to 265 are the same as the processes in steps 163 to 165 that are described above. In step 266, the electric power control module 25 computes the electricity-consumption EC. Specifically, the processed data including the current fuel consumption AFC transmitted from the engine control module 14 is utilized. The fuel consumption data is illustrated by a dashed line in FIG. 10. However, in the present embodiment, the electric power control module 25 does not have the fuel consumption data itself.

In step 267, the electric power control module 25 executes a drive-determination for the generator 21. The electric power control module 25 compares the electricity-consumption EC(n) computed in step 266, the allowable fuel consumption PFC and the determination electricity-consumption EPT. The electric power control module 25 determines whether the operation mode of the generator 21 exists so that an increase in fuel consumption rate can be restricted. The electric power control module 25 selects one of the allowable fuel consumption PFC and the determination electricity-consumption EPT as a threshold, which has less fuel consumption rate.

When the electricity-consumption EC indicates that the fuel consumption rate increases, the electric power control module 25 defines the electricity-consumption EC(n) which is less than the threshold. The electric power control module 25 defines the operation mode of the generator 21 where the electricity-consumption EC(n) can be less than the threshold. Then, the electric power control module 25 operates the generator 21 at the defined operation mode. When all of the electricity-consumption EC(n) exceeds the threshold, the generator 21 is not driven.

In step 267, the allowable fuel consumption PFC is selected as the threshold. The generator 21 is controlled in such a manner that the driving torque GTQ is less than the allowable torque PTQ, whereby the electricity-consumption EC is less than the allowable fuel consumption PFC. For example, the generator 21 is driven at the operation mode in which the electricity-consumption EC(i) is obtained. As a result, an excessive increase in electricity-consumption can be restricted.

Figure 12:
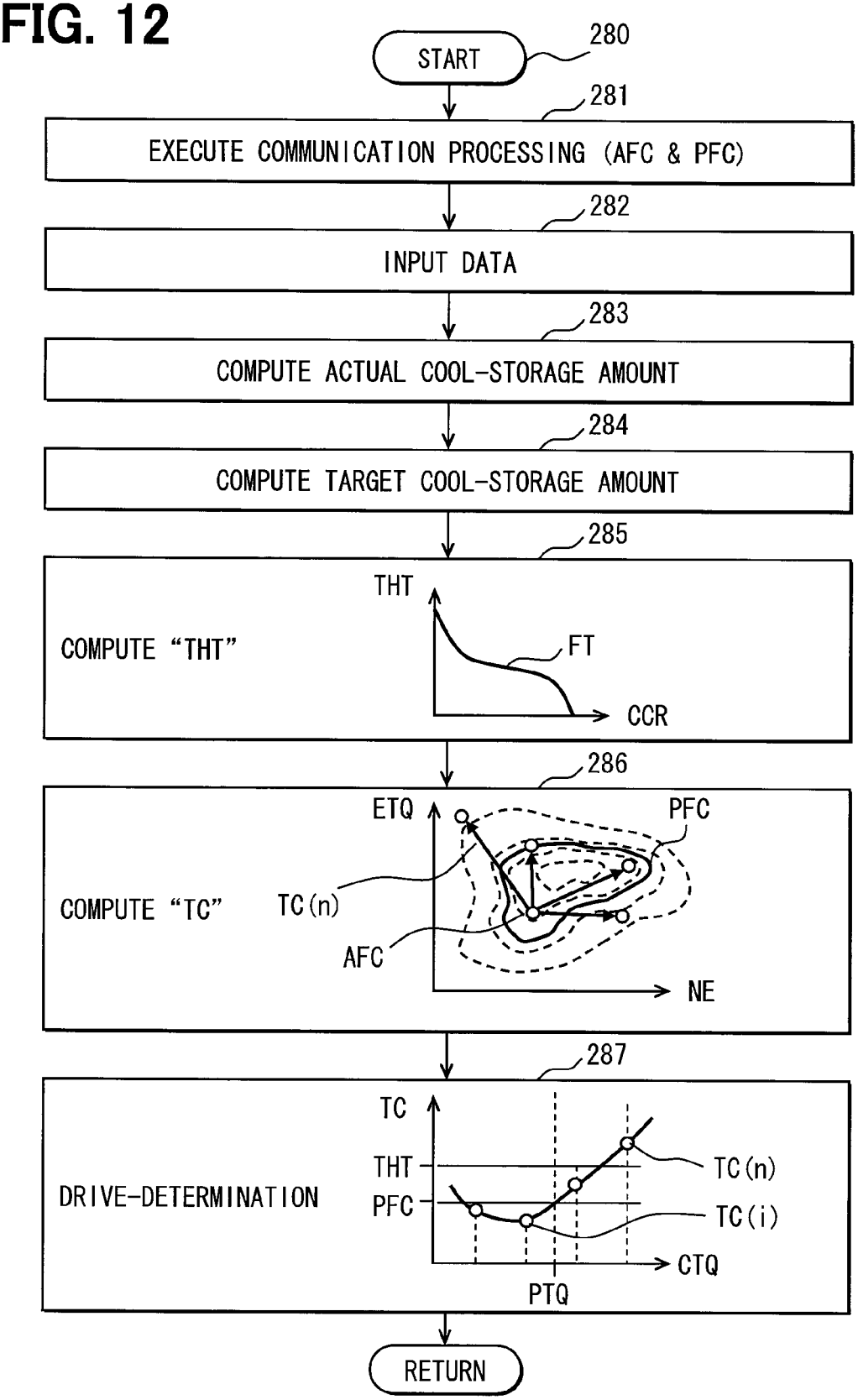
FIG. 12 is a flowchart illustrating processing steps which the air-condition ECU executes, according to the second embodiment.

FIG. 12 is a flowchart showing a heat control processing 280 which the air-conditioning control module 35 executes. In the heat control processing 280, the air-conditioning control module 35 receives the processed data transmitted from the engine control module 14. The compressor 31 is controlled to restrict the heat-consumption based on the received processed data.

In step 281, the air-conditioning control module 35 executes the communication processing. Specifically, the communication cycle preferable for the cool storage control is transmitted. Furthermore, the processed data is received.

Figure 13:
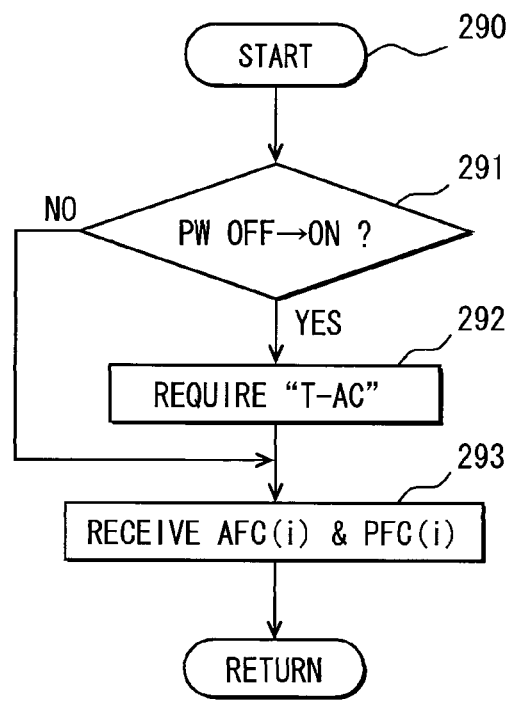
FIG. 13 is a flowchart illustrating a part of processing steps which the air-condition ECU executes according to the second embodiment.

In step 291 of FIG. 13, the air-conditioning control module 35 determines whether the power switch PW is turned ON from OFF, that is, whether it is an initial state. When the answer is YES in step 291, the procedure proceeds to step 292. In step 292, the air-conditioning control module 35 transmits the communication cycle T-AC to the engine control module 14. The communication cycle T-AC is an update cycle of the processed data. The communication cycle T-AC is established as a preferable cycle for performing the cool storage control appropriately. According to the above configuration, a communication cycle is required from the air-conditioning control module 35 to the engine control module 14. Thus, the communication cycle preferable for appropriately executing the cool storage control is established. In step 293, the air-conditioning control module 35 receives the processed data.

Referring back to FIG. 12, in step 282, the air-conditioning control module 35 inputs data required for the cool storage control. The data representing the engine speed NE and the engine torque ETQ are not inputted in step 282. The air-condition ECU 34 can be configured without an interface for inputting the engine speed NE and/or the engine torque ETQ.

The processes in steps 283 to 285 are the same as the processes in steps 183 to 185 that are described above. In step 286, the air-conditioning control module 35 computes the heat consumption TC. Specifically, the processed data including the current fuel consumption AFC transmitted from the engine control module 14 is utilized. The fuel consumption data is illustrated by a dashed line in FIG. 10. However, in the present embodiment, the air-conditioning control module 35 does not have the fuel consumption data itself.

In step 287, the air-conditioning control module 35 executes a drive-determination for the compressor 31. The air-conditioning control module 35 compares the heat-consumption TC(n) computed in step 286, the allowable fuel consumption PFC and the determination heat-consumption THT. The air-conditioning control module 35 determines whether the operation mode of the compressor 31 exists so that an increase in fuel consumption rate can be restricted. The air-conditioning control module 35 selects one of the allowable fuel consumption PFC and the determination heat-consumption THT as a threshold, which has less fuel consumption rate.

When the heat-consumption TC indicates that the fuel consumption rate increases, the air-conditioning control module 35 defines the heat-consumption TC(n) which is less than the threshold. The air-conditioning control module 35 defines the operation mode of the compressor 31 where the heat-consumption TC(n) can be less than the threshold. Then, the air-conditioning control module 35 operates the compressor 31 at the defined operation mode. When all of the heat-consumption TC(n) exceeds the threshold, the compressor 31 is not driven.

In step 287, the allowable fuel consumption PFC is selected as the threshold. The compressor 31 is controlled in such a manner that the driving torque CTQ is less than the allowable torque PTQ, whereby the heat-consumption TC is less than the allowable fuel consumption PFC. For example, the compressor 31 is driven at the operation mode in which the heat-consumption TC(i) is obtained. As a result, an excessive increase in heat-consumption for driving the compressor 31 can be restricted.

According to the present embodiment, by updating the original fuel consumption data stored in one of the control units, the fuel consumption data stored in other control units can be updated. The versatility can be improved.

In the present embodiment, the processed data is computed based on the fuel consumption map in step 253. The fuel consumption associated data which the engine control unit 13 transmits includes the processed data. Therefore, the engine control unit 13 utilizes the fuel consumption map and the electric power ECU 24 and/or the air-condition ECU 34 can utilize the processed data. Thus, it is unnecessary to transmit a lot of fuel consumption maps.

The engine control unit 13 executes processes of steps 252, 254 and 265 which correspond to a periodic transmitting part which transmits the processed data in the communication cycle required by the electric power ECU 24 and/or the air-condition ECU 34. The electric power ECU 24 and/or the air-condition ECU 34 can establish the communication cycle which is preferable for the control thereof. The processed data is updated in the communication cycle. Therefore, the update cycle of processed data is established according to not only the requirement of the engine control module 14 but also the control units which utilize the processed data. Thus, the electric power ECU 24 and/or the air-condition ECU 34 can execute preferable controls.

[Other Embodiment]

The preferred embodiments are described above. The present disclosure is not limited to the above embodiments.

For example, the control units can be configured by software, hardware or a combination thereof. Also, the control unit can be configured by an analog circuit.

The fuel consumption data memory 15 may be provided to the electric power ECU 24 or the air-condition ECU 34. In this case, from the electric power ECU 24 or the air-condition ECU 34, the fuel consumption associated data is transmitted to the engine control unit 13.

In the above embodiments, the heat system 30 is provided with the cool storage 32 which stores the low-temperature thermal energy. Instead of the low-temperature thermal energy, the heat system 30 may be provided with a heat accumulator which stores a high-temperature thermal energy.

The above disclosed system 1 can be applied to a railroad vehicle or a marine vessel.

The engine 11 is an internal combustion engine, such as a gasoline engine and a diesel engine. Moreover, the engine 11 may be an external combustion engine, such as a turbine engine. Instead of the engine 11, a fuel cell can be used as a driving power source. The power supply system 20 utilizes the output of a fuel cell. Moreover, the heat system 30 can be provided with an electrically-driven compressor or an electric heater.

What is claimed is:

1. An energy management system including a power system having a power source which supplies a power by consuming a fuel, and an energy consumption system having a device driven by the power supplied from the power source, the energy management system comprising:

an engine control unit for controlling the power source in such a manner as to restrict a fuel consumption;

a plurality of control units including a device control unit which controls the device in such a manner as to restrict the fuel consumption, wherein:

one of the engine control unit and the device control unit is provided with a memory module in which a fuel consumption associated data about the fuel consumption is stored;

the other control unit executes a control processing based on the fuel consumption associated data transmitted from said control unit;

the fuel consumption associated data is established based on a driving condition of the power source as an parameter;

the fuel consumption associated data includes a fuel map by which the fuel consumption can be retrieved based on the parameter;

one of the engine control unit and the device control unit is provided with:

an expedited-data transmitting portion which transmits an expedited-data portion, which is selected for executing a control of the device control unit based on a driving condition of the power source, toward the other control unit in preference to the other data portions;

a remaining-data transmitting portion which transmits remaining other data portions after the expedited-data portion is transmitted, and the fuel consumption data is divided into multiple portions; and the expedited-data portion corresponds to one of the portions of the fuel consumption data, which are transmitted to the device control unit immediately after an engine controlled by the engine control unit is started.

2. An energy management system according to claim 1, wherein:

the energy consumption system is provided with a power supply system having a generator which is driven by the power source to supply an electric power, and a heat system having a compressor which is driven by the power source to generate a heat energy which is utilized by the energy consumption system;

the power supply system is provided with an electric power control unit as the device control unit; and the heat system is provided with air-condition control unit as the device control unit.

3. An energy management system including a power system having a power source which supplies a power by consuming a fuel, and an energy consumption system having a device driven by the power supplied from the power source, the energy management system comprising:

an engine control unit for controlling the power source in such a manner as to restrict a fuel consumption;

a plurality of control units including a device control unit which controls the device in such a manner as to restrict the fuel consumption, wherein:

one of the engine control unit and the device control unit is provided with a memory module in which a fuel consumption associated data about the fuel consumption is stored;

the other control unit executes a control processing based on the fuel consumption associated data transmitted from said control unit;

one of the engine control unit and the device control unit is provided with a computation portion which computes a processed data according to a fuel map in which the fuel consumption can be retrieved based on a parameter indicating a driving condition of the power source;

the fuel consumption associated data includes only the processed data, and the fuel consumption data is divided into multiple portions; and one of the engine control unit and the device control unit is configured to transmit to the other control unit expedited data corresponding to one of the portions of the fuel consumption data, which are transmitted to the device control unit immediately after an engine controlled by the engine control unit is started.

4. An energy management system according to claim 3, wherein:

the processed data includes a current fuel consumption.

5. An energy management system according to claim 3, wherein:

the processed data includes an allowable fuel consumption for determining whether the device can be operated.

6. An energy management system according to claim 3, wherein:

one of the engine control unit and the device control unit is provided with a periodic transmitting part which transmits the processed data in a communication cycle required by the other control unit.

7. An energy management system according to claim 2, wherein:

the energy consumption system is an air conditioning system for a vehicle, a device temperature regulation system in order to adjust a temperature of in-vehicle parts or a heating system for heating in-vehicle parts.

\* \* \* \* \*